United States Patent
Kuwabara

(10) Patent No.: US 11,016,299 B2
(45) Date of Patent: May 25, 2021

(54) STORAGE MEDIUM, CONTROL METHOD, AND CONTROL DEVICE FOR CHANGING SETTING VALUES OF A WEARABLE APPARATUS

(71) Applicant: FUJITSU LIMITED, Kawasaki (JP)

(72) Inventor: Hiroshi Kuwabara, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/197,341

(22) Filed: Nov. 20, 2018

(65) Prior Publication Data
US 2019/0162969 A1 May 30, 2019

(30) Foreign Application Priority Data

Nov. 27, 2017 (JP) .............................. JP2017-226886

(51) Int. Cl.
| | | |
|---|---|---|
| *G02B 27/01* | (2006.01) | |
| *H04N 5/232* | (2006.01) | |
| *G02B 27/00* | (2006.01) | |

(52) U.S. Cl.
CPC ..... *G02B 27/0172* (2013.01); *G02B 27/0075* (2013.01); *H04N 5/23296* (2013.01); *G02B 2027/0123* (2013.01); *G02B 2027/0138* (2013.01)

(58) Field of Classification Search
None
See application file for complete search history.

(56) References Cited

U.S. PATENT DOCUMENTS

| | | | | |
|---|---|---|---|---|
| 9,678,571 | B1* | 6/2017 | Robert | .................. G06F 1/1684 |
| 2002/0033797 | A1* | 3/2002 | Masthoff | ............. G06F 3/04847 345/156 |
| 2004/0202446 | A1* | 10/2004 | Namkoong | ............ G11B 20/18 386/263 |
| 2004/0233222 | A1* | 11/2004 | Lee | ..................... G06F 3/04815 345/621 |
| 2007/0033544 | A1* | 2/2007 | Fleisher | ................. G06F 3/0481 715/800 |
| 2014/0009470 | A1* | 1/2014 | Spitzer | ................ G06F 9/44505 345/440 |
| 2017/0053663 | A1* | 2/2017 | Yu | ........................... G06T 7/246 |
| 2017/0123492 | A1* | 5/2017 | Marggraff | ............. G06F 3/0236 |
| 2019/0146578 | A1* | 5/2019 | Ikuta | ................... G06F 3/04815 |

FOREIGN PATENT DOCUMENTS

| | | |
|---|---|---|
| JP | 5-165894 | 7/1993 |
| JP | 6-068145 | 3/1994 |

* cited by examiner

*Primary Examiner* — Patrick F Valdez
(74) *Attorney, Agent, or Firm* — Fujitsu Patent Center

(57) ABSTRACT

A computer-readable storage medium having stored therein a program for causing a control device to execute receiving an instruction for changing a setting value of a wearable device and changing the setting value with a change width based on a difference between a current setting value and a maximum setting value or a change width based on a difference between a current setting value and a minimum setting value in response to the instruction.

6 Claims, 13 Drawing Sheets

PREDETERMINED TIME PERIOD
HAS ELAPSED OR
ZOOM-IN OPERATION AFTER
PREDETERMINED TIME PERIOD
HAS ELAPSED

PREDETERMINED TIME PERIOD HAS ELAPSED OR ZOOM-OUT OPERATION AFTER PREDETERMINED TIME PERIOD HAS ELAPSED

STORAGE MEDIUM, CONTROL METHOD, AND CONTROL DEVICE FOR CHANGING SETTING VALUES OF A WEARABLE APPARATUS

CROSS-REFERENCE TO RELATED APPLICATION

This application is based upon and claims the benefit of priority of the prior Japanese Patent Application No. 2017-226886, filed on Nov. 27, 2017, the entire contents of which are incorporated herein by reference.

FIELD

The embodiments discussed herein are related to a storage medium, a control method, and a control device.

BACKGROUND

A user sometimes performs an operation of changing a zoom magnification upon a mobile terminal when using the camera function of the mobile terminal. For example, in a case where a zoom magnification change button is provided at a mobile terminal and a user operates the button, a zoom magnification is changed step by step.

Smart devices such as smartphones have been widely used in recent years. In the case of smart devices, the change in the zoom magnification is performed by, for example, the pinch-in operation, the pinch-out operation, or the slide operation on the touch panel display of such a smart device. By performing, for example, the pinch-in, pinch-out, or slide operation once, the zoom magnification is changed to a desired magnification.

Related arts are disclosed in Japanese Laid-open Patent Publication Nos. 5-165894 and 6-68145.

SUMMARY

According to an aspect of the embodiments, a computer-readable storage medium having stored therein a program for causing a control device to execute receiving an instruction for changing a setting value of a wearable device and changing the setting value with a change width based on a difference between a current setting value and a maximum setting value or a change width based on a difference between a current setting value and a minimum setting value in response to the instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, on a head-mounted display that is a wearable device, a user is incapable of directly operating a screen. Therefore, the user is incapable of changing the zoom magnification of a camera provided at the head-mounted display by performing, for example, the pinch-in, pinch-out, or slide operation.

In the case of a head-mounted display for which a zoom magnification may be changed by the operation of a button provided at a controller, the number of times of the button operation performed until the achievement of a zoom magnification desired by a user is sometimes large.

Such a problem may arise in wearable devices other than head-mounted displays at the time of the changes in setting values other than a zoom magnification.

It is an object of the present disclosure to reduce the number of times of the operation of changing the setting value of a wearable device.

<Example of Head-Mounted Display>

Figure 1:
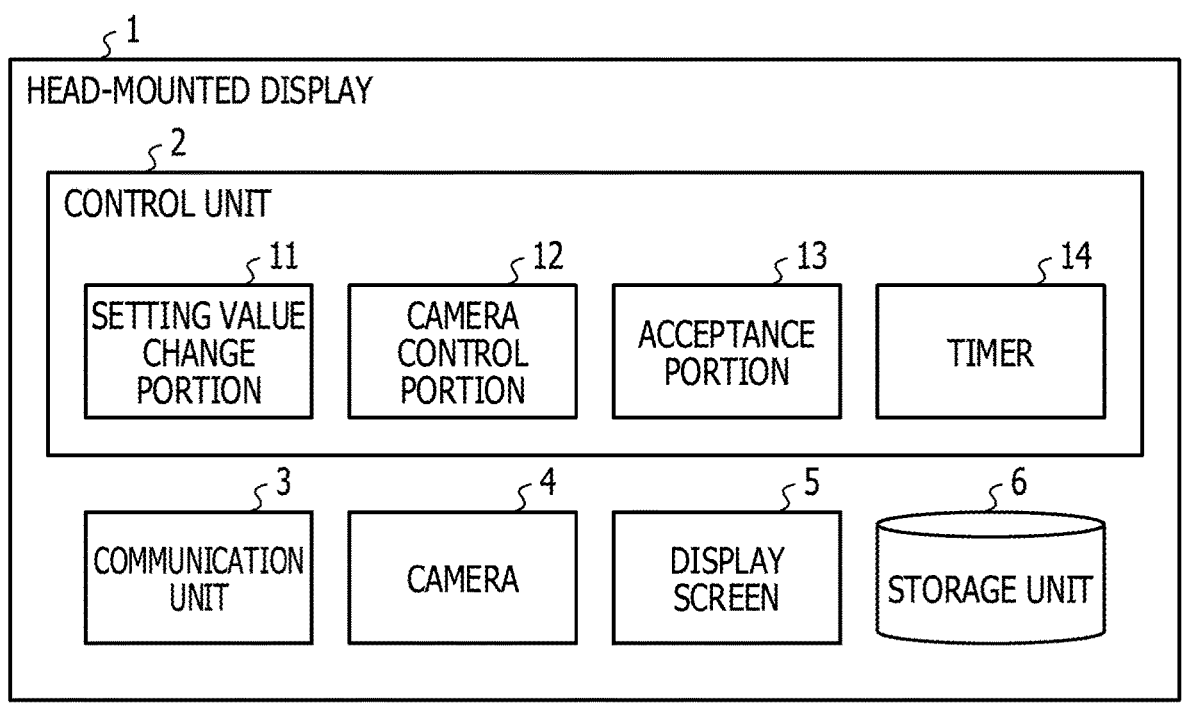
FIG. 1 is a functional block diagram illustrating an example of a head-mounted display.
Figure 1:
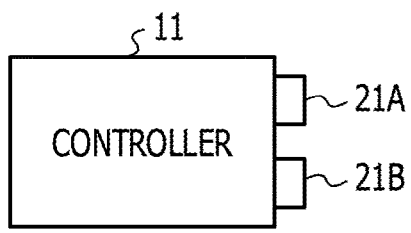

An embodiment of the present disclosure will be described with reference to the accompanying drawings. FIG. 1 illustrates an example of a head-mounted display according to an embodiment of the present disclosure. A head-mounted display is an example of a wearable device. A wearable device may be an optional device other than a head-mounted display.

A head-mounted display 1 includes a control unit 2, a communication unit 3, a camera 4, a display screen 5, and a storage unit 6. The control unit 2 performs various pieces of processing according to an embodiment of the present disclosure. The communication unit 3 performs near field communication with a controller 21. In an embodiment of the present disclosure, the function of the control unit 2 is realized by a control device included in the head-mounted display 1.

The controller 21 is operated by a user wearing the head-mounted display 1. The controller 21 is provided with a zoom-in button 21A and a zoom-out button 21B. The controller 21 may be provided buttons other than the zoom-in button 21A and the zoom-out button 21B.

When the zoom-in button 21A is pressed, the controller 21 transmits to the communication unit 3 a signal indicating that a zoom-in operation has been performed. The camera 4 performs processing for increasing a zoom magnification (enlargement processing) in accordance with the signal.

When the zoom-out button 21B is pressed, the controller 21 transmits to the communication unit 3 a signal indicating that a zoom-out operation has been performed. The camera 4 performs processing for reducing the zoom magnification (reduction processing) in accordance with the signal.

The camera 4 captures the image of a target object. As described above, in response to the operation of the controller 21, the zoom magnification of the camera 4 is changed. The display screen 5 displays, for example, an image captured by the camera 4.

In an embodiment of the present disclosure, a user wearing the head-mounted display 1 is incapable of touching the display screen 5. The same holds true with respect to a wearable device other than the head-mounted display 1. The storage unit 6 stores predetermined information. The storage unit 6 stores, for example, zoom magnification information, various parameters, and a control program in accordance with which processing according to an embodiment of the present disclosure is executed.

In an embodiment of the present disclosure, the zoom magnification of the camera 4 is changed in response to the zoom-in operation or the zoom-out operation instructed from the controller 21. For example, a zoom-in or zoom-out voice command may not be input from the controller 21 but from a microphone or the like into the head-mounted display 1.

The control unit 2 includes a setting value change portion 11, a camera control portion 12, an acceptance portion 13, and a timer 14. The setting value change portion 11 changes the zoom magnification of the camera 4 in accordance with a signal representing the zoom-in or zoom-out operation transmitted from the controller 21. The zoom magnification is an example of a setting value. The zoom-in operation is an example of an instruction for increasing the zoom magnification (setting value). The zoom-out operation is an example of an instruction for reducing the zoom magnification (setting value).

The camera control portion 12 changes the zoom magnification of the camera 4 to the zoom magnification set by the setting value change portion 11. The acceptance portion 13 accepts the operation input from the controller 21 via the communication unit 3. The timer 14 counts the amount of time.

<Zoom Magnification Change Operation>

Figure 2A:
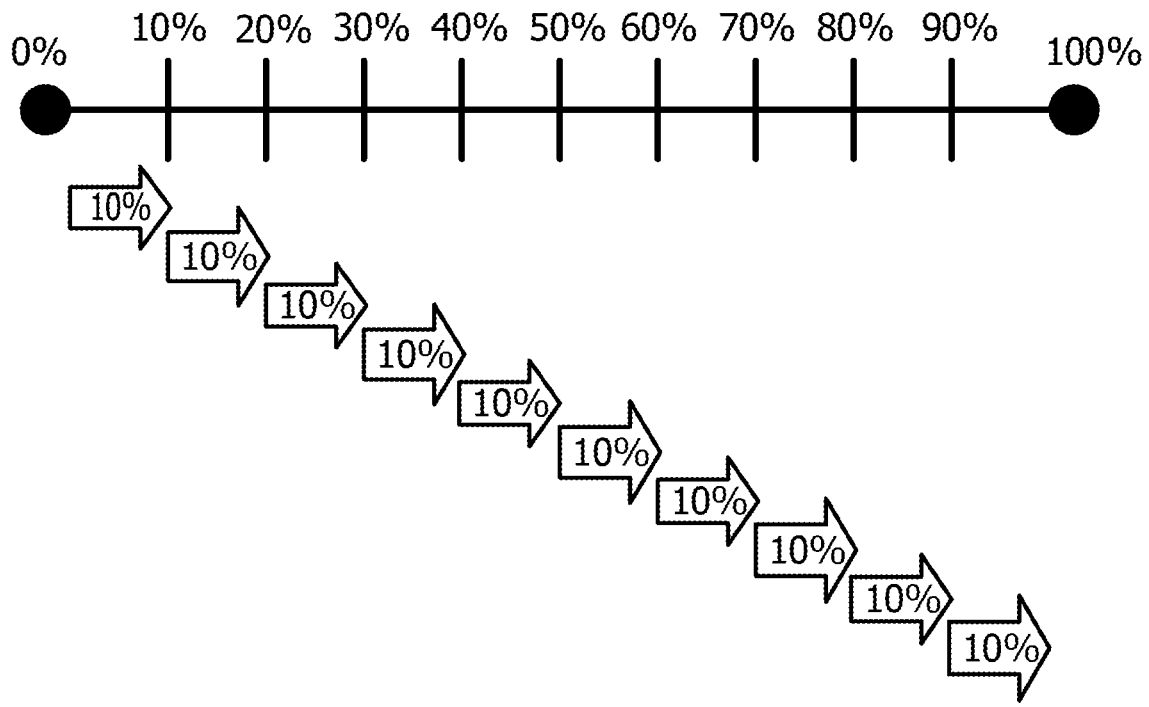
FIGS. 2A and 2B are (first) diagrams illustrating an example of a zoom magnification change operation.

FIG. 2A illustrates an exemplary case where the zoom-in operation is performed by 10% each time the zoom-in button 21A included in the controller 21 is pressed once (an exemplary case where a change width is 10%). In FIGS. 2A to 6, "0%" is the minimum value of the zoom magnification and "100%" is the maximum value of the zoom magnification. The zoom magnification is changed at the pitch of "10%" each time the zoom magnification change operation is performed. The zoom magnification may be changed at a pitch other than "10%".

For example, in a case where the zoom magnification of the camera 4 may be changed from "1×" to "10×", the zoom magnification of "1×" corresponds to "0%" and the zoom magnification of "10×" corresponds to "100%".

In a case where the pitch at which the zoom magnification is changed each time the zoom magnification change operation is performed is "10%" as illustrated in FIG. 2A, the zoom magnification change operation is performed ten times to change the zoom magnification from the minimum value to the maximum value.

In a case where the current zoom magnification of the camera 4 is "0%", a user presses the zoom-in button 21A ten times to change the zoom magnification to 10×. Each time the zoom-in button 21A is pressed, the zoom magnification increases by "10%". After the zoom-in button 21A has been pressed ten times, the zoom magnification becomes the maximum value.

Figure 2B:
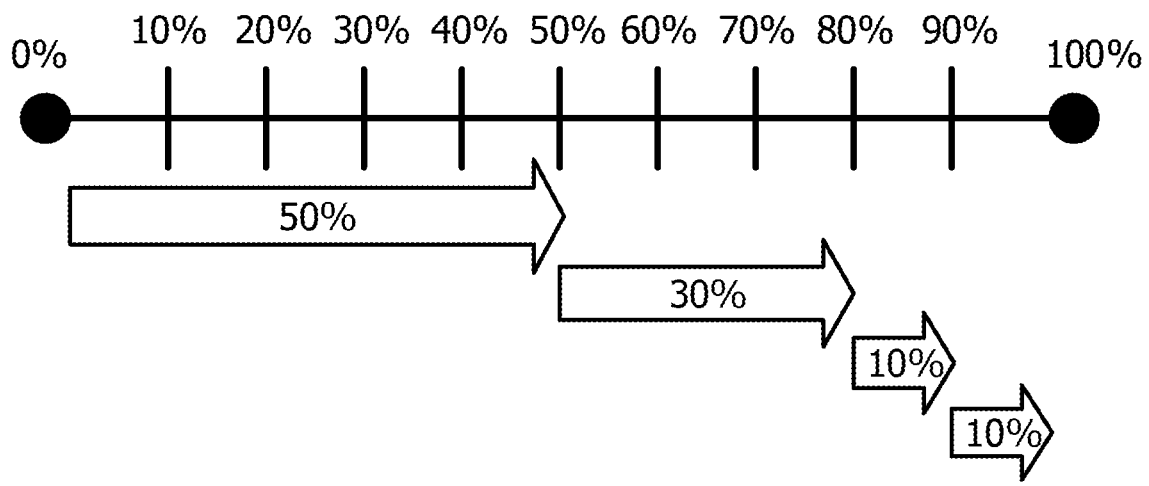

FIG. 2B illustrates an example of a zoom magnification change operation according to an embodiment of the present disclosure. Each time the acceptance portion 13 accepts a zoom magnification change instruction, the setting value change portion 11 changes a setting value with a change width based on the difference between the current setting value and the maximum setting value or the difference between the current setting value and the minimum setting value.

In an embodiment of the present disclosure, the zoom magnification is changed from the minimum value to the half (50%) of the maximum value in response to a first zoom magnification change instruction (the instruction for the zoom-in operation in the example illustrated in FIG. 2B). The setting value change portion 11 increases the zoom magnification in response to the zoom-in operation.

When the acceptance portion 13 receives a change instruction made by the second press of the zoom-in button 21A, the setting value change portion 11 changes the zoom magnification with the change width (=25%) that is half of the difference between the current zoom magnification (=50%) and the maximum zoom magnification (=100%).

The above-described change width that is half of the difference is "25%". As illustrated in FIG. 2B, the zoom magnification change pitch is "10%". The setting value change portion 11 rounds up or off the change width of "25%" to the nearest ten, thereby setting "30%". The change width of "30%" is based on the difference between the current setting value and the maximum setting value. Accordingly, the setting value change portion 11 changes the current zoom magnification to "80%".

When the acceptance portion 13 receives a change instruction made by the third press of the zoom-in button 21A, the setting value change portion 11 changes the zoom magnification with the change width (=10%) that is half of the difference between the current zoom magnification (=80%) and the maximum zoom magnification (=100%). In this case, the current zoom magnification becomes "90%".

When the acceptance portion 13 receives a change instruction made by the fourth press of the zoom-in button 21A, the setting value change portion 11 changes the zoom magnification with the change width (=5%) that is half of the difference between the current zoom magnification (=90%) and the maximum zoom magnification (=100%).

The above-described change width that is half of the difference is "5%". As illustrated in FIG. 2B, the zoom magnification change pitch is "10%". Therefore, the setting value change portion 11 rounds up or off the change width of "5%" to the nearest ten, thereby setting "10%". The change width of "10%" is based on the difference between the current setting value and the maximum setting value. The setting value change portion 11 changes the current zoom magnification to "100%".

In the exemplary case illustrated in FIG. 2A, the number of presses of the zoom-in button 21A performed to change the minimum value to the maximum value of the zoom magnification is 10. On the other hand, in the exemplary case illustrated in FIG. 2B, the number of presses of the zoom-in button 21A performed to change the minimum value to the maximum value of the zoom magnification is 4. Thus, the number of presses of the zoom-in button 21A may be reduced from 10 to 4.

The zoom magnification changed in response to the first change instruction corresponds to the half (=50%) of the width between the minimum value (=0%) and the maximum value (=100%) of the zoom magnification, but may be a value other than "50%". For example, the zoom magnification changed in response to the first change instruction may be "40%" or "60%".

However, in a case where the zoom magnification changed in response to the first change instruction is "40%", the number of times of the operation performed to change the zoom magnification from the minimum value to the maximum value becomes large. On the other hand, in a case where the zoom magnification changed in response to the first change instruction is "60%", it is difficult to set the zoom magnification of, for example, "80%".

Accordingly, it is desirable the zoom magnification be changed with a change width that is half (=50%) of the difference between the minimum value and the maximum value in response to the first zoom magnification change instruction.

In the exemplary case illustrated in FIG. 2A, in a case where the zoom change pitch is the large value of, for example, "25%", the zoom magnification may be changed from the minimum value to the maximum value with a smaller number of times of the operation even in the case of increasing the zoom magnification by one pitch after each operation.

However, with a large zoom change pitch, it is difficult to finely set the zoom magnification. For example, in a case where the zoom change pitch is "25%", the setting of the zoom magnification of "80%" is not realized.

As illustrated in FIG. 2B, each time a zoom magnification change instruction is received, the setting value change portion 11 changes the setting value with a change width based on the difference between the current setting value and the maximum setting value or the current setting value and the minimum setting value. As a result, the fine setting of the zoom magnification may be performed.

Figure 3A:
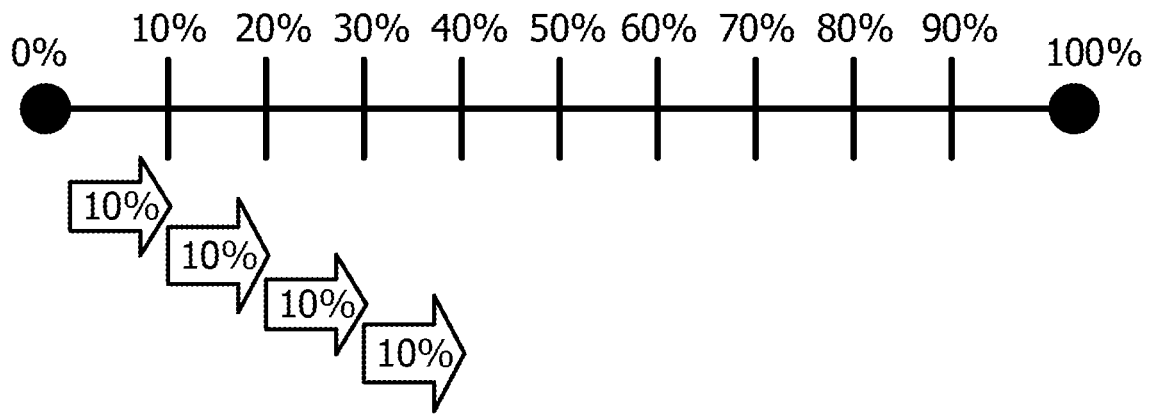
FIGS. 3A and 3B are (second) diagrams illustrating an example of the zoom magnification change operation.

FIG. 3A illustrates an exemplary case where the zoom magnification is changed from "0%" to "40%". In the exemplary case illustrated in FIG. 3A, the zoom change pitch is "10%". In a case where the zoom magnification is changed from the minimum value to "40%", the number of times of the operation of the zoom-in button 21A becomes four.

An exemplary case where the setting value change portion 11 according to an embodiment of the present disclosure changes the zoom magnification from "0%" to "40%" will be described with reference to FIG. 3B.

As described above, each time the acceptance portion 13 receives a zoom magnification change instruction, the setting value change portion 11 changes a setting value with a change width based on the difference between the current setting value and the maximum setting value or the difference between the current setting value and the minimum setting value.

In response to the first zoom magnification change instruction, the zoom magnification is changed from the minimum value to the half (50%) of the maximum value.

Figure 3B:
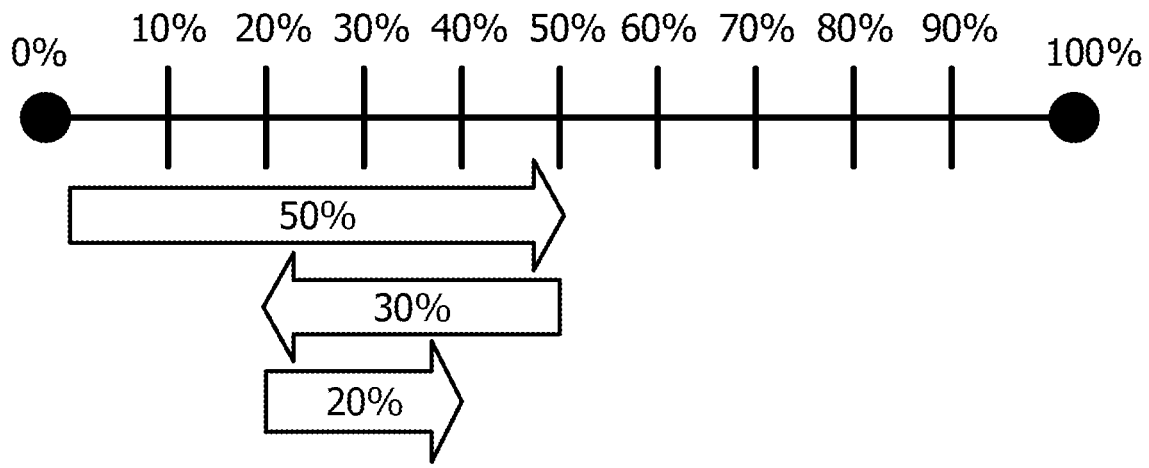

It is assumed that the zoom-out button 21B is pressed in the second operation in the exemplary case illustrated in FIG. 3B. When the zoom-out button 21B is pressed, the setting value change portion 11 reduces the zoom magnification.

The zoom magnification change operation has been switched from the zoom-in operation to the zoom-out operation, but the number of times of the zoom magnification change operation is two. Accordingly, the setting value change portion 11 changes the zoom magnification with the change width (=25%) that is half of the difference between the current zoom magnification (=50%) and the minimum zoom magnification (=0%).

The above-described change width that is half of the difference is "25%", and the zoom magnification change pitch is "10%". Therefore, the setting value change portion 11 rounds up or off the change width of "25%" to the nearest ten, thereby setting "30%". The change width of "30%" is based on the difference between the current setting value and the minimum setting value. Accordingly, the setting value change portion 11 changes the current zoom magnification from "50%" to "20%".

It is assumed that the zoom-in button 21A is pressed in the third operation in the exemplary case illustrated in FIG. 3B. As described above, the zoom operation has been switched from the zoom-in operation to the zoom-out operation and then switched from the zoom-out operation to the zoom-in operation.

In the above-described case, the setting value change portion 11 sets the largest zoom magnification of the zoom magnifications set in the performed zoom-in operations as the maximum value. In the exemplary case illustrated in FIG. 3B, the setting value change portion 11 changes the maximum value of the zoom magnification from "100%" to the zoom magnification of "50%" set in the first operation.

The setting value change portion 11 changes the zoom magnification with the change width (=15%) that is half of the difference between the current zoom magnification (=20%) and the changed maximum zoom magnification (=50%). Since the change width that is half of the difference is "15%", the setting value change portion 11 rounds up or off the change width of "15%" to the nearest ten, thereby setting the change width of "20%". The change width of "20%" is based on the difference between the current setting value and the maximum setting value, and the maximum setting value has already been changed to "50%" as described above.

Accordingly, the setting value change portion 11 changes the current zoom magnification from "20%" to "40%". In the exemplary case illustrated in FIG. 3A, the number of times of the zoom operation performed to set the zoom magnification of "40%" is four. On the other hand, in the exemplary case illustrated in FIG. 3B, the number of times of the zoom operation performed to set the zoom magnification of "40%" is three. Thus, the number of times of the zoom operation performed to set the zoom magnification of "40%" may be reduced.

Figure 4:
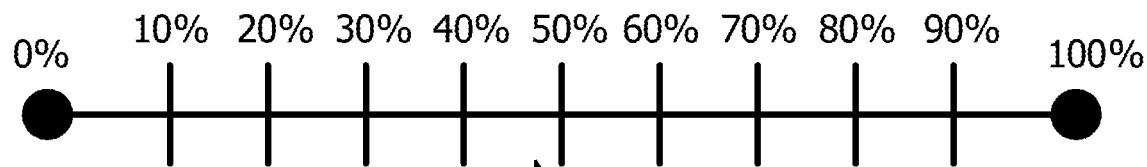
FIG. 4 is a (first) diagram illustrating an example of reset processing.
Figure 4:
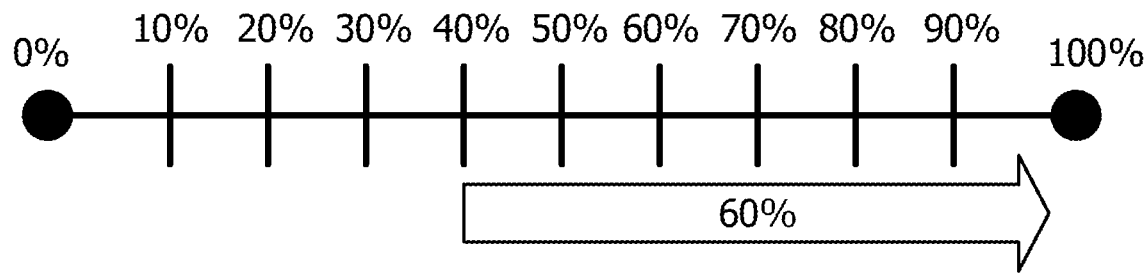

FIG. 4 is a diagram illustrating an example of reset processing. The reset processing is processing for causing the setting value change portion 11 to set the zoom magnification to the minimum value (=0%) or the maximum value (=100%) after a predetermined time period has elapsed. The predetermined time period may be optionally set.

In a case where the zoom operation is not performed for the predetermined time period, the image capturing target of the camera 4 may be changed. For example, as illustrated in FIG. 4, it is assumed that the zoom magnification of "40%" is set and the image of a target captured by the camera 4 is displayed on the display screen 5.

A user wearing the head-mounted display 1 may visually identify an image capturing target different from the above-described image capturing target after a predetermined time period has elapsed. For example, the appropriate zoom magnification of the image capturing target different from the above-described image capturing target may be "100%".

As described above, each time the zoom magnification change instruction is received, the setting value change portion 11 changes the setting value with the change width based on the difference between the current setting value and the maximum setting value or the difference between the current setting value and the minimum setting value. Accordingly, upon receiving the zoom magnification change instruction, the setting value change portion 11 changes the setting value.

In a case where the setting value change portion 11 changes the setting value as described above, the change width of the zoom magnification becomes smaller with the increasing number of changes in the zoom magnification. In the exemplary case illustrated in FIG. 4, the change width of the zoom magnification set in response to the last change instruction is "20%". Even if the zoom magnification change instruction is received after that, the change width of the zoom magnification becomes less than "20%".

The setting value change portion 11 therefore performs processing for changing the zoom magnification to the minimum value (=0%) or the maximum value (=100%) after a predetermined time period has elapsed from the last zoom operation. This processing is processing for resetting the zoom operation that has already been performed. The reset processing may realize the setting of a desired zoom magnification even if an image capturing target is changed.

The determination of whether the predetermined time period has elapsed may be performed based on a result of determination of whether the time counted by the timer 14 has reached the predetermined time period.

The setting value change portion 11 may determine which of "0%" and "100%" is to be set as the zoom magnification based on the zoom operation accepted after the predetermined time period has elapsed. For example, in a case where the acceptance portion 13 accepts the zoom-in operation after the predetermined time period has elapsed, the setting value change portion 11 may set the zoom magnification of "100%".

The reason for this is that, in a case where the zoom-in operation is performed after the predetermined time period has elapsed, a user wearing the head-mounted display 1 may intend to display the enlarged image of a new image capturing target on the display screen 5.

Figure 5:
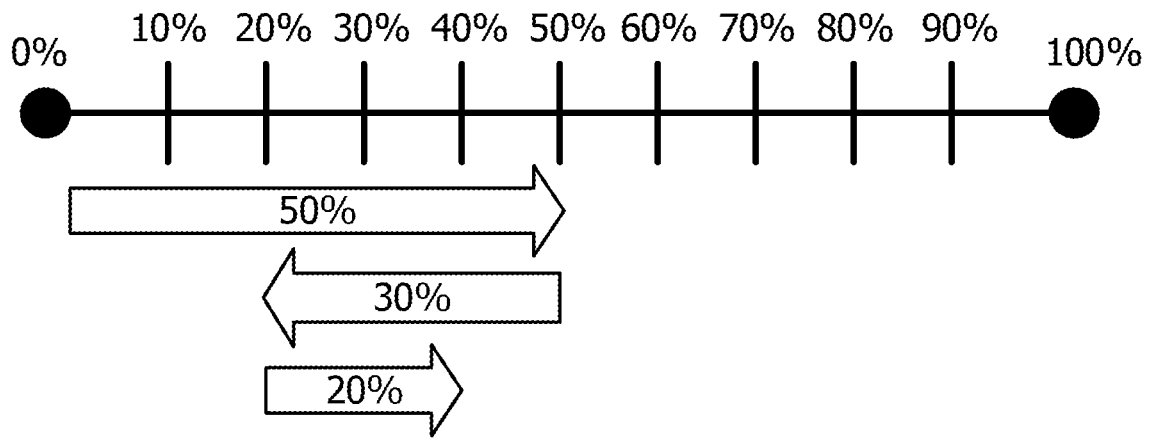
FIG. 5 is a (second) diagram illustrating an example of the reset processing.
Figure 5:
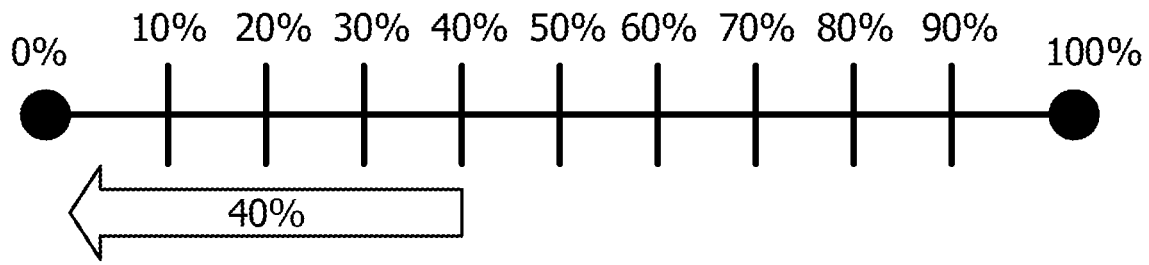

On the other hand, as illustrated in FIG. 5, in a case where the acceptance portion 13 accepts the zoom-out operation after the predetermined time period has elapsed, the setting value change portion 11 may set the zoom magnification to "0%". The reason for this is that, in a case where the zoom-out operation is performed after the predetermined time period has elapsed, a user wearing the head-mounted display 1 may intend to display the reduced-size image of a new image capturing target on the display screen 5.

Figure 6:
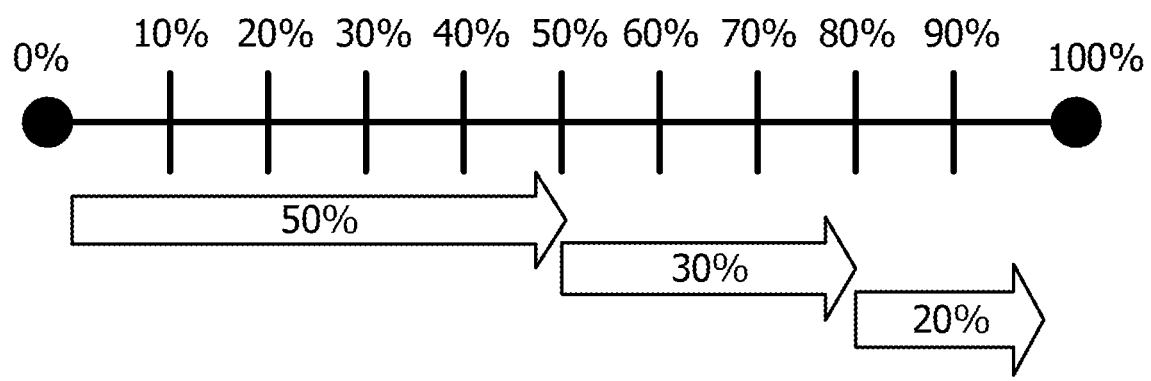
FIG. 6 is a diagram illustrating an example of a continuous zoom-in operation.

FIG. 6 is a diagram illustrating an exemplary continuous zoom-in operation. In a case where the acceptance portion 13 continuously accepts the zoom-in operations a predetermined number of times or more for a predetermined time period, the setting value change portion 11 detects a continuous zoom-in operation. The predetermined time period and the predetermined number of times may be optionally set.

In a case where the zoom-in operation is continuously performed the predetermined number of times or more for the predetermined time period (the continuous zoom-in operation is performed), a user wearing the head-mounted display 1 may intend to set the zoom magnification to the maximum value.

In a case where the continuous zoom-in operation is detected, the setting value change portion 11 sets the zoom magnification to "100%". In the exemplary case illustrated in FIG. 2B, the zoom-in operation is performed four times to change the zoom magnification from "0%" to "100%". On the other hand, in the exemplary case illustrated in FIG. 6, the number of the continuous zoom-in operations performed to change the zoom magnification from "0%" to "100%" is three. Accordingly, the number of times of the operation performed to set a desired zoom magnification becomes smaller.

The same holds true with respect to a case where the zoom-out operation is continuously performed. In a case where the acceptance portion 13 continuously accepts the zoom-out operation a predetermined number of times or more for a predetermined time period, the setting value change portion 11 detects a continuous zoom-out operation.

In a case where the zoom-out operation is continuously performed the predetermined number of times or more for the predetermined period (the continuous zoom-out operation is performed), a user wearing the head-mounted display 1 may intend to set the zoom magnification to the minimum value. In a case where the continuous zoom-out operation is detected, the setting value change portion 11 sets the zoom magnification to "0%". Also in the case of the continuous zoom-out operation, the number of times of the operation becomes smaller like in the case of the continuous zoom-in operation.

<Process According to Embodiment>

An example of a process according to an embodiment of the present disclosure will be described with reference to flowcharts illustrated in FIGS. 7 to 12B. In the following, a current zoom magnification represents a current zoom magnification set by the camera control portion 12. A new zoom magnification represents a new zoom magnification changed from the current zoom magnification by the zoom magnification change operation.

A current zoom magnification MAX represents the maximum value of the current zoom magnification. A current zoom magnification MIN represents the minimum value of the current zoom magnification. The initial value of the current zoom magnification MAX is "100%", and the initial value of the current zoom magnification MIN is "0%".

As described above, in a case where the switching from the zoom-in operation to the zoom-out operation or the switching from the zoom-out operation to the zoom-in operation is performed, the maximum value (the current zoom magnification MAX) or the minimum value (the current zoom magnification MIN) of the zoom magnification is changed. A reset flag indicates whether reset processing is to be performed.

Figure 7:
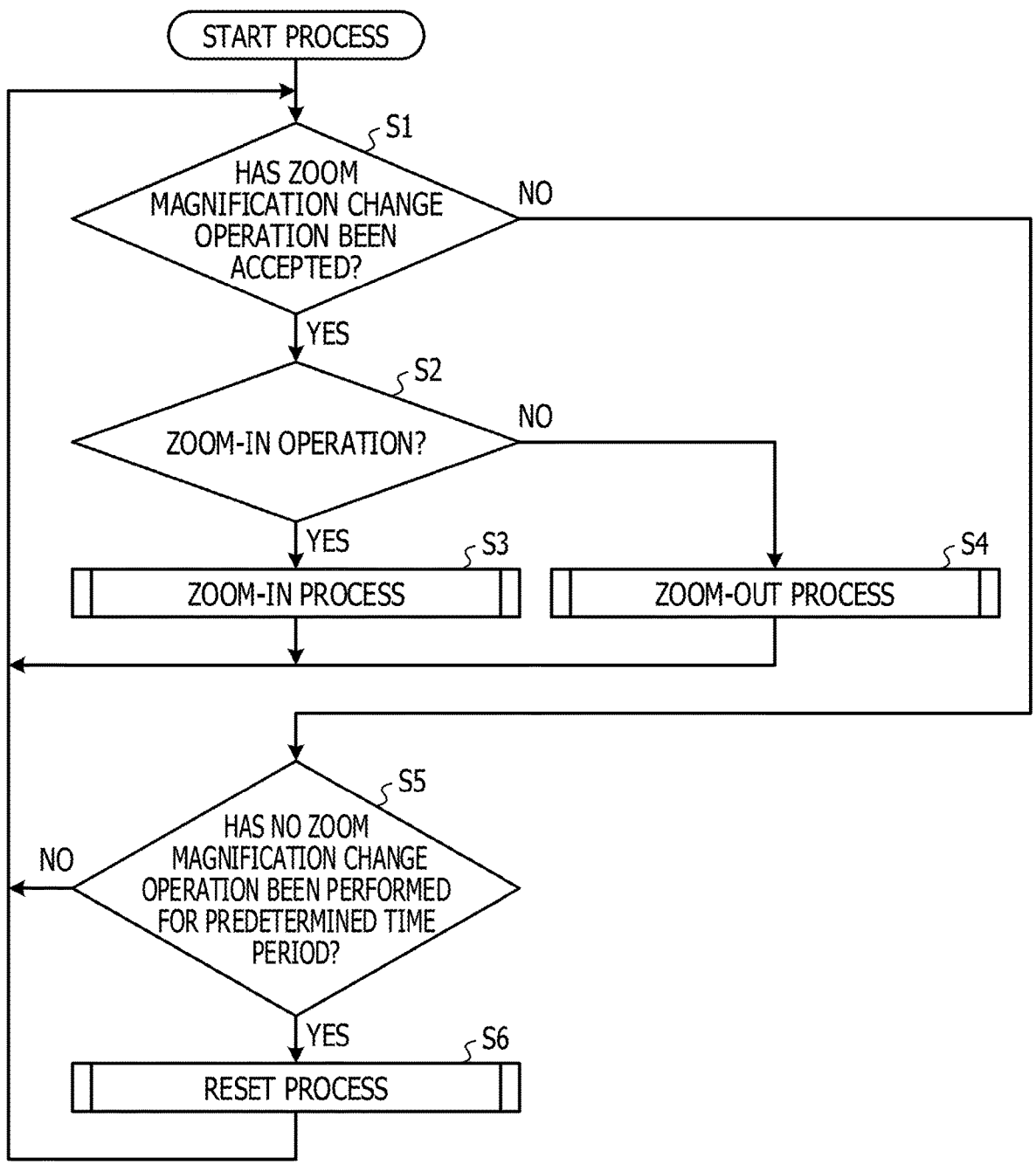
FIG. 7 is a flowchart illustrating an example of a process according to an embodiment of the present disclosure.

As illustrated in FIG. 7, the control unit 2 determines whether the acceptance portion 13 has received from the controller 21 a signal indicating that the zoom magnification change operation has been performed (step S1).

When a user wearing the head-mounted display 1 presses the zoom-in button 21A, the controller 21 transmits to the head-mounted display 1 a signal indicating that the zoom-in operation has been performed in response to the press operation.

When a user wearing the head-mounted display 1 presses the zoom-out button 21B, the controller 21 transmits to the head-mounted display 1 a signal indicating that the zoom-out operation has been performed in response to the press operation.

In the case of YES in step S1, the setting value change portion 11 determines whether the accepted zoom magnification change operation is the zoom-in operation based on the above-described signal (step S2). In the case of YES in step S2, the setting value change portion 11 performs a zoom-in process (step S3). In the case of NO in step S2, the setting value change portion 11 performs a zoom-out process (step S4).

After step S3 or S4, the process returns to step S1. In the case of NO in step S1, the control unit 2 determines whether the zoom magnification change operation has not been performed for a predetermined time period (step S5). In the case of NO in step S5, the process returns to step S1. In the case of YES in step S5, the setting value change portion 11 performs a reset process (step S6). After step S6, the process returns to step S1.

The zoom-in process will be described with reference to FIG. 8. The setting value change portion 11 determines whether the accepted zoom-in operation is the continuous zoom-in operation (step S11).

For example, in a case where the number of times of the zoom-in operation continuously performed for a predetermined time period reaches a predetermined number, the setting value change portion 11 may determine that the accepted zoom-in operation is the continuous zoom-in operation. In this case, the determination of YES is performed in step S11.

In the case of NO in step S11, the setting value change portion 11 determines whether the reset flag indicates ON (step S12). In the case of NO in step S12, the setting value change portion 11 acquires the current zoom magnification from the camera control portion 12 (step S13).

The setting value change portion 11 sets the current zoom magnification acquired in step S13 as the current zoom magnification MIN (step S14). For example, in a case where the current zoom magnification is "50%", the current zoom magnification MIN becomes "50%".

The setting value change portion 11 adds the current zoom magnification and the current zoom magnification MAX, divide a result of the addition by "2", and sets a result of the division as the new zoom magnification (step S15). For example, in a case where the current zoom magnification MAX is "100%" that is an initial value, a result of the division in step S15 becomes "75%" because the current zoom magnification is "50%".

As described above, since the zoom magnification pitch is "10%", the setting value change portion 11 rounds off or up the division result of "75%". Accordingly, the new zoom magnification becomes "80%". The setting value change portion 11 sets the new zoom magnification as the current zoom magnification (step S16).

In the case of YES in step S11, the setting value change portion 11 performs a continuous zoom-in process (step S17). Even in the case of NO in step S11, the continuous zoom-in process is performed in step S17 in the case of YES in step S12.

After the above-described predetermined time period has elapsed, the reset flag is set to ON. Accordingly, in a case where the zoom-in operation is performed after the above-described predetermined time period has elapsed, the process of step S17 is performed.

Figure 9:
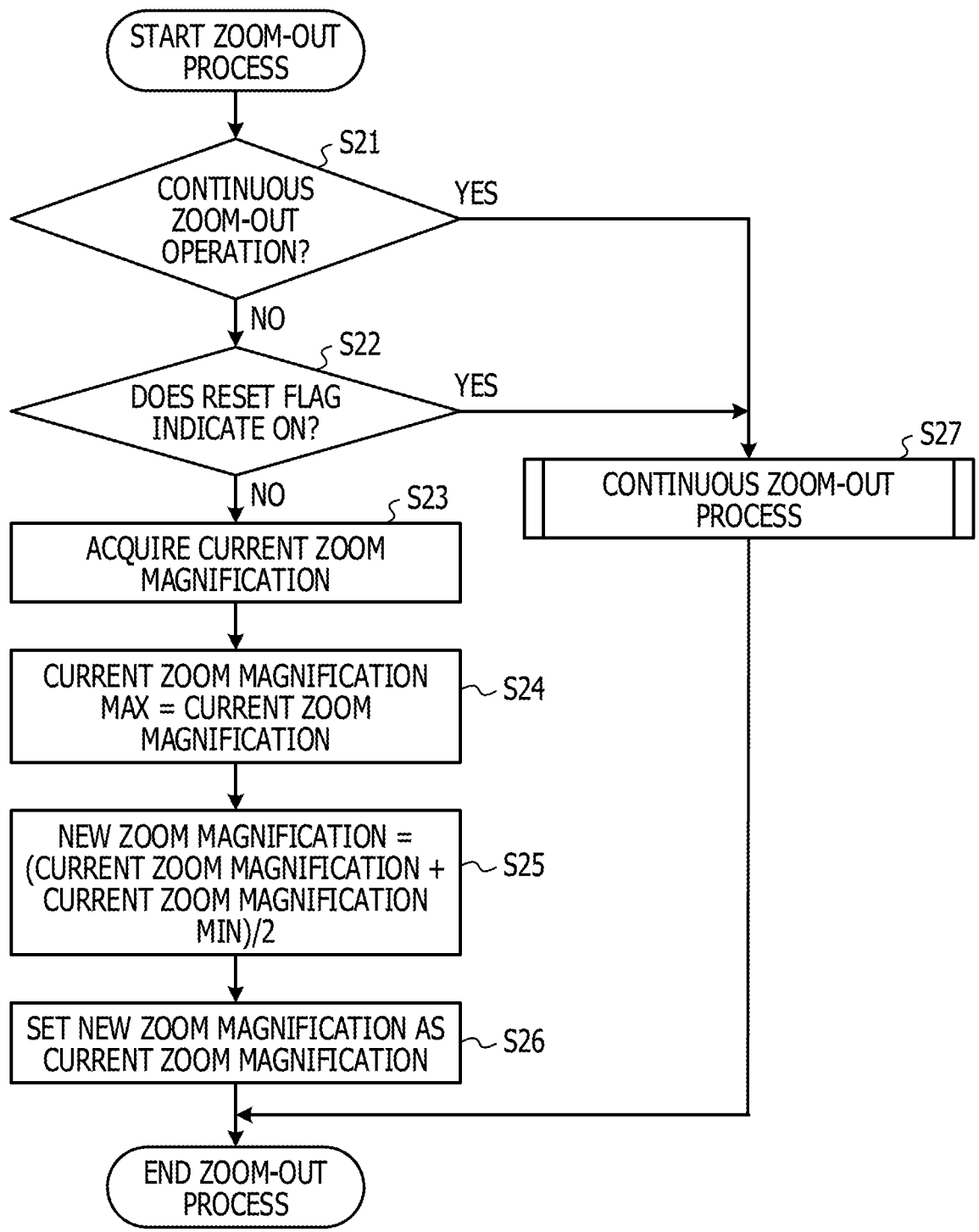
FIG. 9 is a flowchart illustrating an example of a zoom-out process.

The zoom-out process will be described with reference to FIG. 9. The setting value change portion 11 determines whether the accepted zoom-out operation is the continuous zoom-out operation (step S21).

For example, in a case where the number of times of the zoom-out operation continuously performed for a predetermined time period reaches a predetermined number, the setting value change portion 11 may determine that the accepted zoom-out operation is the continuous zoom-out operation.

In the case of NO in step S21, the setting value change portion 11 determines whether the reset flag indicates ON (step S22). In the case of NO in step S22, the setting value change portion 11 acquires a current zoom magnification from the camera control portion 12 (step S23).

The setting value change portion 11 sets the current zoom magnification acquired in step S23 as the current zoom magnification MAX (step S24). For example, in a case where the current zoom magnification is "80%", the current zoom magnification MAX becomes "80%".

The setting value change portion 11 divides a result of addition of the current zoom magnification and the current zoom magnification MIN by "2" and sets a result of the division as the new zoom magnification (step S25). For example, in a case where the current zoom magnification MIN is "50%", a result of the division in step S15 becomes "65%" because the current zoom magnification is "80%" as described above.

Since the zoom magnification pitch is "10%" as described above, the setting value change portion 11 rounds off or up the division result of "65%". Accordingly, the new zoom magnification becomes "70%". The setting value change portion 11 sets the new zoom magnification as the current zoom magnification (step S26).

In the case of YES in step S21, the setting value change portion 11 performs a continuous zoom-out process (step S27). Even in the case of NO in step S21, the continuous zoom-out process is performed in step S27 in the case of YES in step S22.

After the predetermined time period has elapsed, the reset flag is set to ON. Accordingly, in a case where the zoom-out operation is performed after the predetermined time period has elapsed, the process of step S27 is performed.

Figure 10:
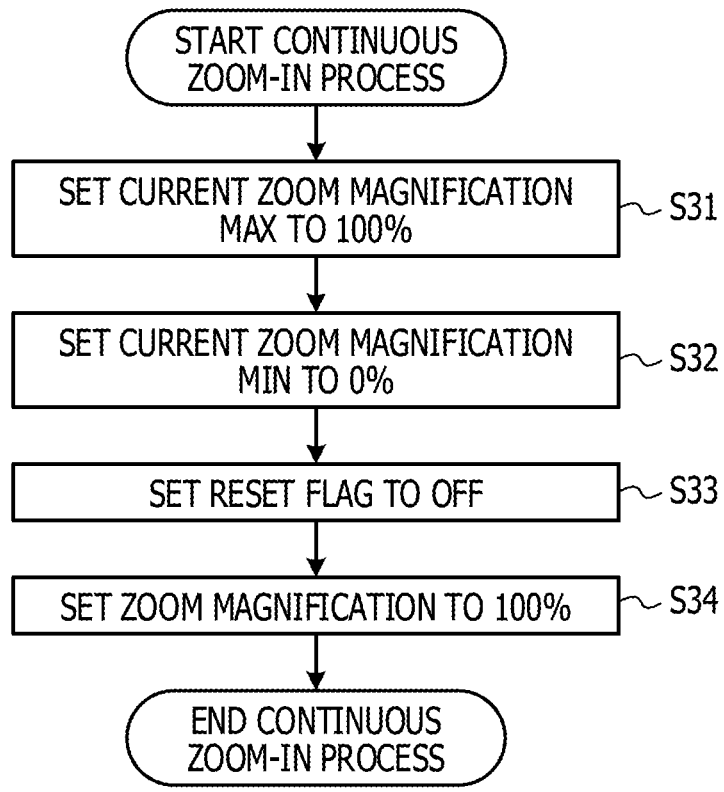
FIG. 10 is a flowchart illustrating an example of a continuous zoom-in process.

The continuous zoom-in process will be described with reference to the flowchart illustrated in FIG. 10. The setting value change portion 11 sets the current zoom magnification MAX to "100%" (step S31). The setting value change portion 11 sets the current zoom magnification MIN to "0%" (step S32). By the pieces of processing of steps S31 and S32, the current zoom magnification MAX and the current zoom magnification MIN are set back to the initial values.

Since the current zoom magnification MAX and the current zoom magnification MIN are set back to the initial values, the setting value change portion 11 sets the reset flag to OFF (step S33). As described above, in a case where the continuous zoom-in operation is performed, the setting value change portion 11 sets the zoom magnification to "100%" (step S34).

Figure 11:
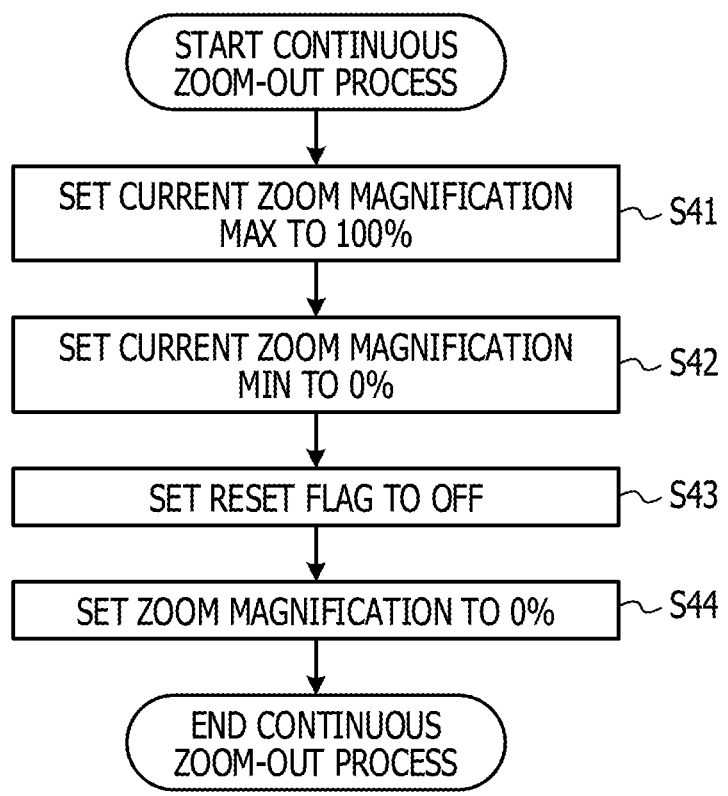
FIG. 11 is a flowchart illustrating an example of a continuous zoom-out process.

The continuous zoom-out process will be described with reference to the flowchart illustrated in FIG. 11. The setting value change portion 11 sets the current zoom magnification MAX to "100%" (step S41). The setting value change portion 11 sets the current zoom magnification MIN to "0%" (step S42). By the pieces of processing of steps S41 and S42, the current zoom magnification MAX and the current zoom magnification MIN are set back to the initial values.

Since the current zoom magnification MAX and the current zoom magnification MIN are set back to the initial values, the setting value change portion 11 sets the reset flag to OFF (step S43). As described above, in a case where the continuous zoom-out operation is performed, the setting value change portion 11 sets the zoom magnification to "0%" (step S44).

Figure 12A:
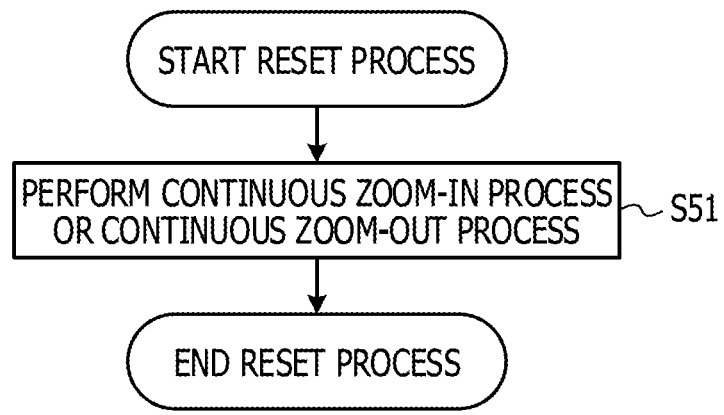
FIGS. 12A and 12B are flowcharts illustrating examples of a reset process.

The reset process will be described with reference to FIGS. 12A and 12B. As described above, the reset process is performed in a case where the zoom magnification change operation is not performed for a predetermined time period. FIG. 12A illustrates an example of the reset process.

The setting value change portion 11 performs the continuous zoom-in process or the continuous zoom-out process (step S51). As a result of the performance of the continuous zoom-in process or the continuous zoom-out process, the current zoom magnification MAX and the current zoom magnification MIN are set back to the initial values. The current zoom magnification MAX and the current zoom magnification MIN are set back to the initial values, so that the reset process is performed.

Figure 12B:
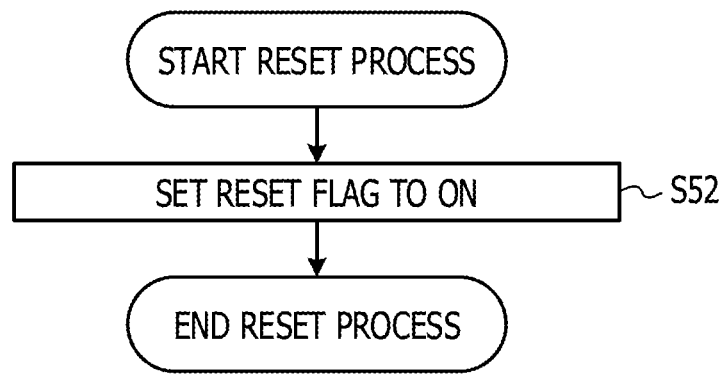

The reset process illustrated in FIG. 12B may be performed. Referring to FIG. 12B, the setting value change portion 11 sets the reset flag to ON (step S52). When the reset flag is set to ON, the determination results in step S12 in FIG. 8 and step S22 in FIG. 9 become YES.

Figure 8:
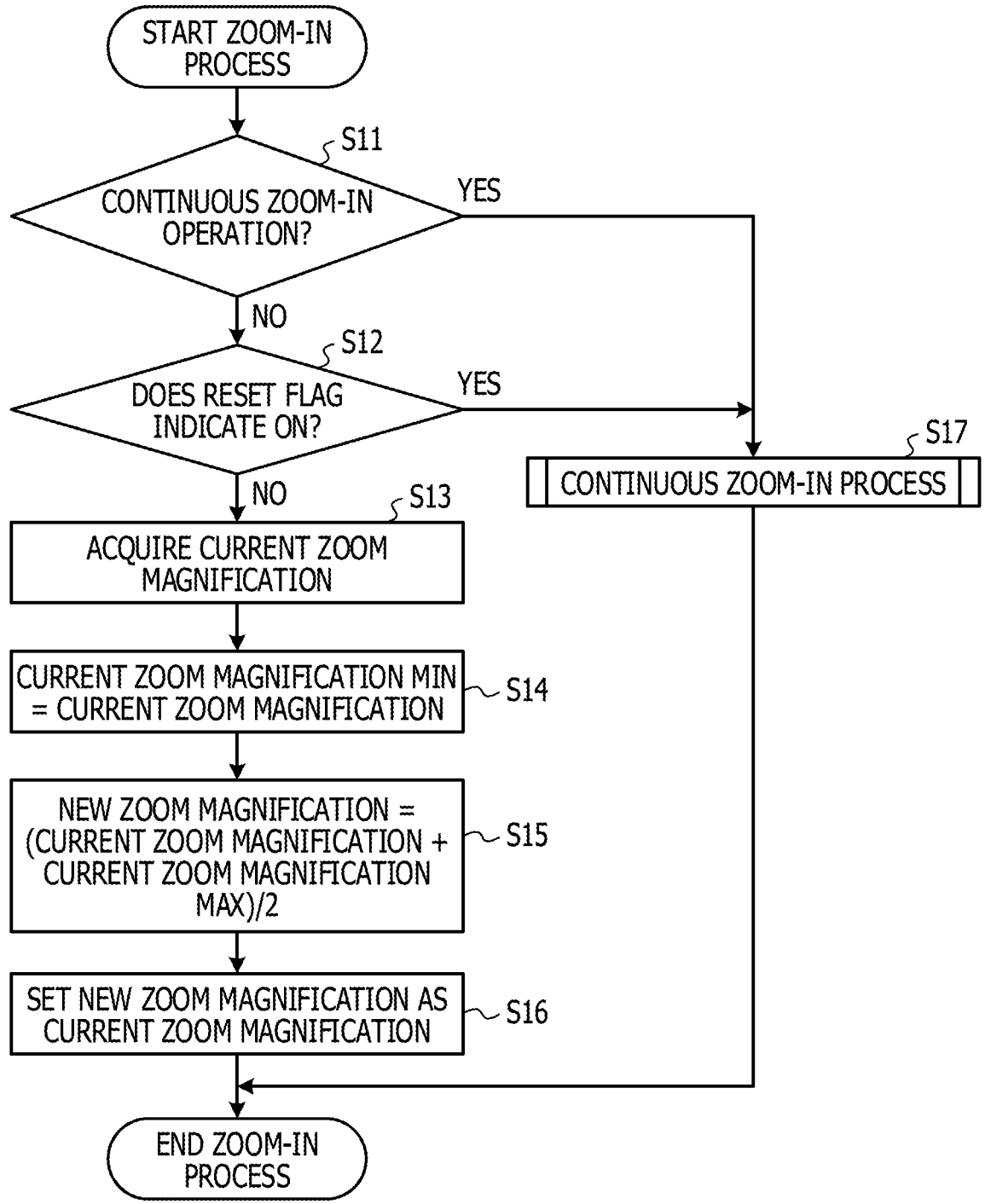
FIG. 8 is a flowchart illustrating an example of a zoom-in process.

In the case of YES in step S12 in FIG. 8, the continuous zoom-in process is performed. In the case of YES in step S22 in FIG. 9, the continuous zoom-out process is performed. The continuous zoom-in process or the continuous zoom-out process is performed, so that the current zoom magnification MAX and the current zoom magnification MIN are set back to the initial values.

<Exemplary Hardware Configuration of Control Device>

Next, an exemplary hardware configuration of a control device for performing a processing according to an embodiment of the present disclosure will be described with reference to FIG. 13. The control device is included in a wearable device such as a head-mounted display.

Figure 13:
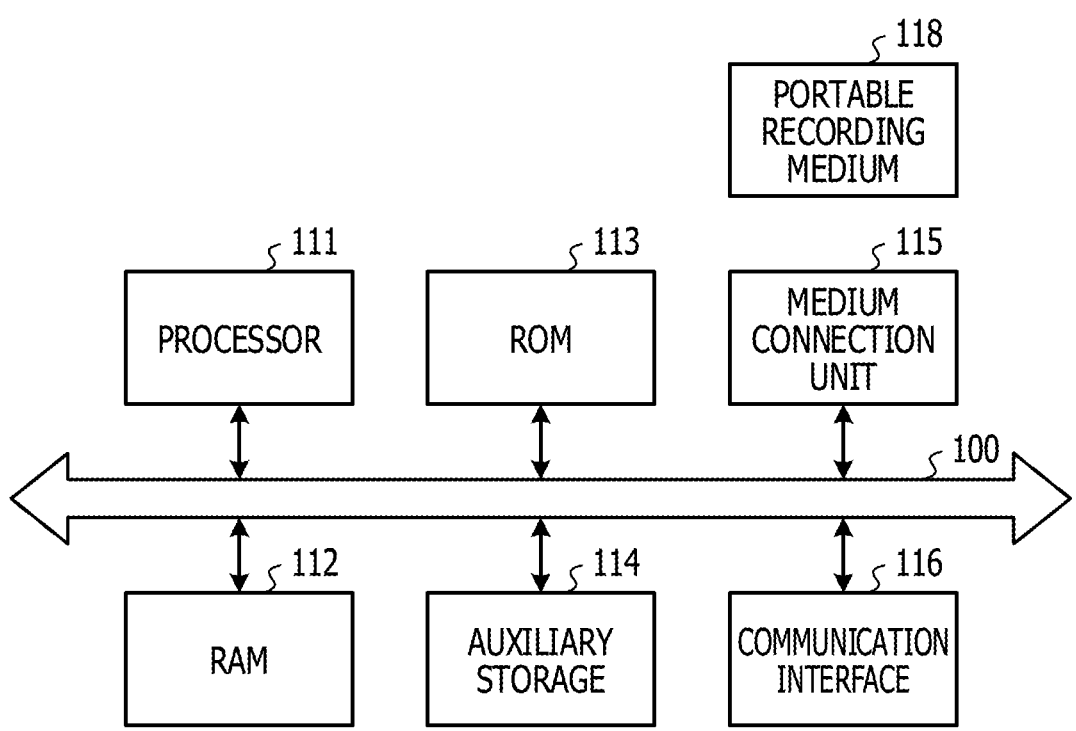
FIG. 13 is a diagram illustrating an exemplary hardware configuration of a control device.

As illustrated in FIG. 13, a processor 111, a random access memory (RAM) 112, and a read-only memory (ROM) 113 are connected to a bus 100. An auxiliary storage 114, a medium connection unit 115, and a communication interface 116 are connected to the bus 100.

The processor 111 executes a program deployed in the RAM 112. As a program to be executed, a program for performing processing according to an embodiment of the present disclosure may be used.

The ROM 113 is a nonvolatile storage device for storing a program to be deployed in the RAM 112. The auxiliary storage 114 is a storage for storing various pieces of information. For example, as the auxiliary storage 114, a semiconductor memory may be used. The medium connection unit 115 is provided in a manner that it is connectable to a portable recording medium 115M.

As the portable recording medium 115M, a portable memory (for example, a semiconductor memory) may be used. A program for performing processing according to an embodiment of the present disclosure may be recorded in the portable recording medium 115M.

The control unit 2 may be realized by the processor 111 executing a given program. A control device included in a wearable device may be realized by, for example, an integrated circuit such as a field-programmable gate array (FPGA).

Any of the RAM 112, the ROM 113, the auxiliary storage 114, and the portable recording medium 115M is an example of a tangible computer-readable storage medium. These tangible storage media are not temporary media such as signal carrier waves.

OTHER EMBODIMENTS

In the above-described embodiment, a setting value is the setting value of a zoom magnification. However, the setting value may be the setting value of, for example, volume adjustment, fast forward, or fast rewind. The above-described embodiment of the present disclosure may be applied at the time of changing the setting value.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a program for causing a control device to execute:

receiving an instruction for changing a setting value of a wearable device: and changing the setting value with a change width, in accordance with a binary search, based on a difference between a current setting value and a maximum setting value or a change width based on a difference between the current setting value and a minimum setting value in response to the instruction, wherein the changing includes:

when the instruction includes first information indicating enlargement processing, changing the setting value by the change width based on half of a first width that is difference between the current setting value and the maximum setting value, and when the instruction includes second information indicating reduction processing, changing the setting value by the change width based on half of a second width that is difference between the current setting value and the minimum setting value, wherein the changing further includes setting the setting value to the initial minimum value or the initial maximum value after a predetermined time period has elapsed from receipt of the instruction for changing the setting value, wherein, in a case where the instruction for increasing the setting value is received after the predetermined time period has elapsed, the setting value is set to the initial maximum value, and wherein, in a case where the instruction for decreasing the setting value is received after the predetermined time period has elapsed, the setting value is set to the initial minimum value.

2. The storage medium according to claim 1, wherein the changing includes, setting, in a case where an instruction for increasing the setting value is changed to an instruction for decreasing the setting value, a current setting value obtained at a time of the instruction change as the maximum setting value, and setting, in a case where an instruction for decreasing the setting value is changed to an instruction for increasing the setting value, a current setting value obtained at a time of the instruction change as the minimum setting value.

3. The storage medium according to claim 1, wherein a change width with which the setting value is changed in response to a first instruction for changing the setting value is half of a width between a minimum value and a maximum value of the setting value.

4. The storage medium according to claim 2, wherein, in a case where the instruction for increasing the setting value or the instruction for decreasing the setting value is continuously received a predetermined number of times or more for a predetermined time period, the setting value is set to an initial minimum value or an initial maximum value.

5. A control method comprising:
receiving an instruction for changing a setting value of a wearable device; and
changing the setting value with a change width, in accordance with a binary search, based on a difference between a current setting value and a maximum setting value or a change width based on a difference between the current setting value and a minimum setting value in response to the instruction,
wherein the changing includes:
when the instruction includes first information indicating enlargement processing, changing the setting value by the change width based on half of a first width that is difference between the current setting value and maximum setting value, and
when the instruction includes second information indicating reduction processing, changing the setting value by the change width based on half of a second width that is difference between the current setting value and the minimum setting value, wherein
the changing further includes setting the setting value to the initial minimum value or the initial maximum value after a predetermined time period has elapsed from receipt of the instruction for changing the setting value, wherein, in a case where the instruction for increasing the setting value is received after the predetermined time period has elapsed, the setting value is set to the initial maximum value, and
wherein, in a case where the instruction for decreasing the setting value is received after the predetermined time period has elapsed, the setting value is set to the initial minimum value.

6. A control device comprising:
a memory; and
a processor coupled to the memory and configured to:
receive an instruction for changing a setting value of a wearable device; and
change the setting value with a change width, in accordance with a binary search, based on a difference between a current setting value and a maximum setting value or a change width based on a difference between the current setting value and a minimum setting value in response to the instruction,
wherein the processor is configured to:
when the instruction includes first information indicating enlargement processing, change the setting value by the change width based on half of a first width that is difference between the setting current value and maximum setting value, and
when the instruction includes second information indicating reduction processing, change the setting value by the change width based on half of a second width that is difference between the current value and minimum value, wherein
the processor sets the setting value to the initial minimum value or the initial maximum value after a predetermined time period has elapsed from receipt of the instruction for changing the setting value, wherein, in a case where the instruction for increasing the setting value is received after the predetermined time period has elapsed, the setting value is set to the initial maximum value, and
wherein, in a case where the instruction for decreasing the setting value is received after the predetermined time period has elapsed, the setting value is set to the initial minimum value.

* * * * *